US012059685B2

(12) United States Patent
Massafra et al.

(10) Patent No.: US 12,059,685 B2
(45) Date of Patent: Aug. 13, 2024

(54) HYBRID DISC

(71) Applicant: OMYA INTERNATIONAL AG, Oftringen (CH)

(72) Inventors: Francesco Massafra, Therwil (CH); Christoph Rogels, Lorrach (DE)

(73) Assignee: OMYA INTERNATIONAL AG, Oftringen (CH)

( * ) Notice: Subject to any disclaimer, the term of this patent is extended or adjusted under 35 U.S.C. 154(b) by 654 days.

(21) Appl. No.: 17/046,511

(22) PCT Filed: Apr. 4, 2019

(86) PCT No.: PCT/EP2019/058563

§ 371 (c)(1),
(2) Date: Oct. 9, 2020

(87) PCT Pub. No.: WO2019/201615

PCT Pub. Date: Oct. 24, 2019

(65) Prior Publication Data

US 2021/0107011 A1 Apr. 15, 2021

(30) Foreign Application Priority Data

Apr. 16, 2018 (EP) .................................... 18167551

(51) Int. Cl.
*B02C 17/18* (2006.01)
*B02C 17/16* (2006.01)

(52) U.S. Cl.
CPC .......... *B02C 17/163* (2013.01); *B02C 17/161* (2013.01); *B02C 2017/165* (2013.01); *B02C 17/18* (2013.01)

(58) Field of Classification Search
CPC ........................ B02C 17/163; B02C 2017/165
See application file for complete search history.

(56) References Cited

U.S. PATENT DOCUMENTS 1,144,352 A * 6/1915 Cornwall ............ B02C 13/2804 241/192
1,181,158 A * 5/1916 Ogden ................ B02C 13/2804 241/192

(Continued)

FOREIGN PATENT DOCUMENTS

CN 1454704 A 11/2003
CN 201216950 Y 4/2009

(Continued)

OTHER PUBLICATIONS

International Search Report for PCT Application No. PCT/EP2019/058563, Mailed Jun. 4, 2019, 12 pages.

(Continued)

*Primary Examiner* — Faye Francis
(74) *Attorney, Agent, or Firm* — Lippes Mathias LLP

(57) ABSTRACT

A circular disc element having at least two beam elements. Each beam element extends beyond an outer circumference of the circular disc element in an extension direction which is parallel to a radial direction of the disc element. The circular disc element further includes at least two holes extending through the circular disc element in a longitudinal direction which is substantially perpendicular to each of the extension directions with respect to a circumferential direction of the circular disc element, which circumferential direction corresponds to the outer circumference of the circular disc element. The circular disc element can function as a grinding means in a grinding process for grinding slurry.

15 Claims, 7 Drawing Sheets

(56) References Cited

U.S. PATENT DOCUMENTS

| | | | | | |
|---|---|---|---|---|---|
| 1,791,669 | A * | 2/1931 | Frickey | B02C 13/26 241/223 |
| 1,803,148 | A * | 4/1931 | Sheppard, Jr. | B02C 13/28 241/193 |
| 2,196,722 | A * | 4/1940 | Clement | B02C 13/28 241/197 |
| 2,626,719 | A * | 1/1953 | Stock | B65G 65/00 222/476 |
| 2,656,119 | A * | 10/1953 | Shelton, Jr. | B02C 13/00 241/46.08 |
| 2,847,168 | A * | 8/1958 | Smiley | B02C 13/00 222/138 |
| 4,174,074 | A | 11/1979 | Geiger | |
| 4,513,917 | A * | 4/1985 | Szkaradek | B02C 17/163 241/46.11 |
| 4,775,393 | A * | 10/1988 | Boecker | B02C 17/16 51/293 |
| 4,932,166 | A * | 6/1990 | Boecker | C04B 35/565 51/293 |
| 5,067,661 | A * | 11/1991 | Eide | B02C 18/16 241/DIG. 38 |
| 2003/0209618 | A1* | 11/2003 | Sneeringer | B01F 33/8305 241/172 |
| 2005/0001079 | A1* | 1/2005 | Ford | B02C 17/186 241/18 |
| 2005/0211808 | A1* | 9/2005 | Geiger | B02C 17/18 241/172 |
| 2008/0191072 | A1* | 8/2008 | Schall | B02C 17/166 241/70 |
| 2011/0186664 | A1* | 8/2011 | Lucas | F26B 11/12 241/38 |
| 2011/0309174 | A1* | 12/2011 | Rubenstein | B02C 17/163 241/79 |
| 2014/0003189 | A1 | 1/2014 | Gerl et al. | |
| 2014/0166795 | A1 | 6/2014 | Mogan et al. | |
| 2016/0001295 | A1 | 1/2016 | Borges et al. | |
| 2018/0207644 | A1* | 7/2018 | Heath | B02C 17/16 |
| 2018/0229242 | A1* | 8/2018 | Lindblom | D21D 1/306 |
| 2022/0118459 | A1* | 4/2022 | Knecht | B02C 17/16 |

FOREIGN PATENT DOCUMENTS

| | | | |
|---|---|---|---|
| CN | 201267771 | Y | 7/2009 |
| CN | 201267772 | Y | 7/2009 |
| CN | 2011002752 | A1 | 1/2011 |
| CN | 102612409 | A | 7/2012 |
| CN | 104624307 | A | 5/2015 |
| CN | 206526883 | U | 9/2017 |
| DE | 202008006745 | U1 | 9/2008 |
| DE | 102011005519 | A1 | 9/2012 |
| DE | 102015005604 | A1 | 11/2016 |
| DE | 102016115357 | A1 | 2/2018 |
| EP | 1358940 | A1 | 11/2003 |
| EP | 2871000 | A | 5/2015 |
| JP | 2008104910 | A | 5/2008 |
| JP | 2013000702 | A | 1/2013 |
| KR | 101299515 | B1 | 8/2013 |
| RU | 2601556 | U1 | 6/2015 |
| RU | 152869 | C1 | 11/2016 |
| WO | 2017012809 | A1 | 1/2017 |
| WO | 2017017315 | A1 | 2/2017 |

OTHER PUBLICATIONS

Office Action for Chinese Application No. 210980025967.6, dated Nov. 3, 2021, 9 pages.

* cited by examiner

HYBRID DISC

FIELD OF THE INVENTION

The invention generally relates to grinding processes of mineral slurries. In particular, the invention relates to a circular disc element, a use of a circular disc element, a device for grinding slurry and a method for grinding a mineral slurry.

BACKGROUND OF THE INVENTION

Grinding processes have already been used for more than half a century in the ceramics, pigment, paint, paper and pharmaceutical industry. In such a process, coarse slurry particles are introduced into a specified device in which these coarse slurry particles are ground, usually in the presence of grinding media like ceramic grinding beads, in order to obtain a finer product particle size of the slurry. The grinding of the mineral slurry is carried out by mixing the introduced slurry and the grinding beads or media using grinding discs which are mounted on a mill shaft within a chamber. In particular, the mineral slurry is conveyed through the chamber and the coarse particles in the slurry are ground during conveyance within the chamber so as to obtain a refined mineral slurry at the outlet of the chamber. Such devices for grinding slurry are also called mills. Classical mills however do not allow for using the total potential power of the rotor on which the discs are mounted, thus achieving only lower power input and lower feed rates. Furthermore, it is highly desirable to extend the lifetime of the rotor discs. In particular, the component lifetime depends on the application type and the imposed stress on the rotor discs. The power input of a stirred media mill is directly influenced by stirrer revolutions per minute. An optimum setting of speed will assist in prolonging the lifetime of the rotor discs. There might be a particular need for rotor discs which are running at a lower speed effectively decreasing shear forces between discs and grinding media. Furthermore, there might be a need to save a considerable amount of material and labour for operating such mills or devices for grinding slurry. Not least, there might be a need to provide a cheaper disc with respect to the effort of maintenance and service requirements.

SUMMARY OF THE INVENTION

It is an object of the present invention to provide an improved grinding of mineral slurries.

This object is achieved by the subject-matter of the independent claims. Further exemplary embodiments are evident from the dependent claims and the following description.

According to a first aspect of the present invention, a circular disc element is provided. The circular disc element comprises at least two beam elements each beam element extending beyond an outer circumference of the circular disc element in an extension direction which is parallel to a radial direction of the disc element. It is also possible that the extension direction is radially extending with respect to the disc element, i.e. the extension direction is congruent to the radial direction. The circular disc element further comprises at least two holes extending through the circular disc element in a longitudinal direction which is substantially perpendicular to each of the extension directions of the at least two beam elements. For example, the longitudinal direction is substantially perpendicular to the radial direction of the disc element. In particular, the at least two holes may extend through the circular disc element in a longitudinal, rotationally symmetric axial direction which is substantially perpendicular to each of the extension directions of the at least two beam elements. The at least two beam elements are equidistantly spaced apart from each other with respect to a circumferential direction of the circular disc element, which circumferential direction corresponds to the outer circumference of the circular disc element.

The circumferential direction may be measured along the circumference of the circular disc element. Along this circumferential direction, the at least two beam elements are spaced apart from each other in an equidistant manner. This means that in case of two beam elements, the angle between each beam element amounts to 180°. In case of three beam elements, the angle between each beam element with respect to the circumferential direction amounts to 120°. However, in a preferred embodiment, the circular disc element comprises exactly four beam elements such that the angle between each beam element with respect to the circumferential direction amounts to 90°. According to other embodiments of the present invention, the circular disc element comprises five or more and up to twelve, i.e. five to twelve beam elements.

The circular disc element may also be called a hybrid disc since the beam elements which extend beyond the outer circumference of the circular disc element are connected in an adjustable manner to the circular disc element. Such a hybrid disc in a stirred media mill, e.g. in a device for grinding slurry, which will be described hereinafter, provides the possibility of having a higher power input and an enhanced slurry throughput. For example, wet mineral slurry, in particular calcium carbonate slurry, may be advantageously ground using inventive circular disc elements. Based on such a circular disc element, the bypass flow will be reduced and, additionally, the product quality will be improved since less retains, e.g. coarse particles, remain in the ground slurry. Furthermore, the inventive circular disc element provides for less recirculation, a higher power draw at lower rotational speeds of the circular disc element(s) within the mill and an increased efficiency of the operation of a stirred media mill, e.g. a device for grinding slurry containing grinding media, like ceramic grinding beads.

The circular disc element may for instance be attached to a rotational shaft within a chamber of said mill, which is also defined as a device for grinding slurry hereinafter. The hybrid disc, e.g. the circular disc element, is a combination of a centre disc section and agitating arms. The agitating arms are defined as the beam elements, which extend beyond the outer circumference of the circular disc element. The centre disc section is defined as the circular disc element itself. By means of the centre disc section, e.g. the circular disc element, the unintended bypass flow along the rotational shaft can be reduced. Due to a high power input, the hybrid disc can be operated at lower rotational speed. As a result, the inventive circular disc element allows for improving vertical mill operations and maximizing the throughput of slurry within the stirred media mill.

The centre disc section of the hybrid disc, e.g. the circular disc element, comprises at least two beam elements, which may be connected to the circular disc element, e.g. the centre disc, by means of a key connection or a key joint. The outer circumference of the circular disc element may have a circular shape limiting the circular disc element in the radial direction. The circular disc element may have a flat shape, wherein the thickness of the circular disc element is much smaller than the lateral extension of the circular disc element in the radial direction. In other words, the term "flat circular disc element" should be understood as a circular disc element with a diameter measured in the radial direction of the circular disc element that is much greater than the thickness of the circular disc element in the longitudinal direction. For example, the ratio between diameter and thickness is between 20 and 120 and preferably between 25 and 30.

Through the circular disc element, at least two holes, in particular through-holes, extend in the longitudinal direction. The at least two holes may be arranged on the circular disc element in such a manner that the holes are equidistantly spaced apart from each other with respect to the circumferential direction of the circular disc element. There may be a space or distance between the at least two holes and the centre point of the circular disc element. However, there may be a further hole within the circular disc element at its centre for receiving a rotational shaft of the device for grinding slurry described hereinafter. The at least two holes extending through the circular disc element may for instance be steam holes which are required to ensure a stable operation of the mill. In particular, steam bubbles which would disturb the grinding operation by inhomogeneity of the grinding media conditions in the grinding zone can be kept away from the main grinding zone.

The circular disc element, which may be imagined as a flat shaped circular disc may have cutting sections or cut-out sections which form recesses at the circumference of the circular disc element. In these cut-out sections, the beam elements may be attached to the circular disc element. This aspect will be described in more detail in the description of the figures.

The beam elements have an extension direction, which is parallel to a radial direction of the disc element, wherein the radial direction starts at the centre point of the circular disc element. In other words, there is an offset between the extension directions of the beam elements and the radial directions of the circular disc element. However, the term "parallel" does also include that the extension directions of the beam elements are congruent to respective radial directions of the disc element. In particular, the beam elements may also extend beyond the outer circumference of the circular disc element in a radial direction of the circular disc element. In this case, there is no offset between the extension direction of the beam element and the radial direction of the disc element.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments or elements, this is also to be understood to disclose a group, which preferably consists only of these embodiments or elements.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The beam elements and the holes should be arranged such that the disc is in balance (any imbalance should preferably be avoided). Therefore, it is preferred according to the present invention that the number of extending beam elements "n" is even and at least 4 (n=2, 4, 6, 8, 10 etc.), while the number of the holes "m" correlates with the number of the beam elements "n" in that m=k*0.5n, k being 1, 2, 3, 4, 5, 6, 7, 8, 9 or 10 or the number of extending beam elements "n" is uneven (n=3, 5, 7, 9, 11 etc.), while the number of the holes "m" correlates with the number of the beam elements "n" in that m=k*n, k being 1, 2, 3, 4, 5, 6, 7, 8, 9 or 10 or that the number of beam elements "n" is 2, while the number of holes "m" correlates with the number of the beam elements "n" in that m=k*n, k being 1, 2, 3, 4, 5, 6, 7, 8, 9 or 10. For example, the inventive disc may have 4 extending beam elements and 2, 4, 6, 8, 10 and up to 20 holes or e.g. 6 beam elements and 3 or 6 (or more) holes or 3 beam elements with 3, 6, 9 or more holes. According to an embodiment of the invention, the number of extending beam elements is equal to the number of holes extending through the circular disc element.

In a preferred embodiment, four beam elements are attached to the circular disc element and extend beyond the outer circumference of the circular disc element. In this preferred embodiment, also four holes are located on the circular disc element such that these four holes extend through the circular disc element in the longitudinal direction. According to other embodiments of the present invention, the circular disc element may comprise five or more, preferably five to eight and up to twelve, i.e. five to twelve beam elements. The corresponding five to twelve, preferably five to eight beam elements correspondingly may have five to twelve, preferably five to eight holes being located on the circular disc element such that these holes extend through the circular disc element in the longitudinal direction. The axis of the holes may be parallel to an axis of the circular disc element, which axis of the circular disc element goes through the centre point of the circular disc element.

According to another embodiment of the invention, the at least two holes and the at least two beam elements are arranged in an alternate manner on the circular disc element with respect to the circumferential direction.

This means that in case of four beam elements and four holes at the circular disc element, the angle between each beam element amounts to 90° and the angle between each hole also amounts to 90° with respect to the circumferential direction. Between two extending beam elements, one hole is arranged on the circular disc element with respect to the circumferential direction. Analogously, one extending beam element is arranged between two holes on the circular disc element with respect to the circumferential direction.

According to another embodiment of the invention, each of the at least two holes is equidistantly arranged between the at least two beam elements with respect to the circumferential direction.

This means that in case of four holes and four extending beam elements, the angle between each hole amounts to 90° with respect to the circumferential direction and the angle between each extending beam element amounts to 90° with respect to the circumferential direction. Furthermore, in case of four holes and four extending beam elements, the angle between a beam element and a neighbouring hole amounts to 45° in the circumferential direction. However, in the preferred embodiment, the holes and the extending beam elements are arranged in an alternate manner on the circular disc element with respect to the circumferential direction. This aspect will be described in more detail in the description of the figures.

According to another embodiment of the invention, the extension of the at least two beam elements in the longitudinal direction is greater than the extension of the circular disc element in the longitudinal direction. In other words, the at least two beam elements have a thickness measured along the longitudinal direction which is greater than the thickness of the circular disc element which is also measured along the longitudinal direction. This means that the at least two beam elements protrude from abutting surfaces of the circular disc element in a region in which the extending beam elements overlap with the circular disc element, e.g. in a region in which the extending beam elements do not extend beyond the outer circumference of the circular disc element. In particular, there may be two sections of the extending beam elements, wherein in a first section of the extending beam elements, the extending beam elements do not extend beyond the outer circumference of the circular disc element and therefore overlap with the circular disc element whereas in a second section of the extending beam elements, the extending beam elements extend beyond the outer circumference of the circular disc element and therefore protrude beyond the outer circumference of the circular disc element in the extension direction or in the radial direction of the circular disc element.

According to another embodiment of the invention, the extension of the at least two beam elements in the longitudinal direction is adjustable.

In particular, the at least two beam elements are height-adjustable in the longitudinal direction. It is possible that the adjustment of the extension of the at least two beam elements in the longitudinal direction is carried out by a manual change of the at least two beam elements. However, it is also possible that the adjustment of the extension of the at least two beam elements in the longitudinal direction is carried out by a variation of the shape of the at least two beam elements which are attached to the circular disc element. This is especially the case if the beam element forms a part of the disc, for example if the circular disc element and the beam elements are manufactured by iron casting. In other words, the term “adjustable” means not necessarily immediate adjustments but also such adjustments, which result from the production of circular disc elements with different beam shapes.

It is possible that the beam elements and the circular disc element are integrally manufactured. However, it is also possible that the beam elements and the circular disc element are separately manufactured wherein the beam elements are releasably connected to the circular disc element.

According to another embodiment of the invention, the circular disc element further comprises an inner circumference which is defined by a curved fitting surface, wherein the circular disc element is attachable to a rotational shaft by means of a force-fit connection or a form-fit connection.

Such a force-fit connection or a form-fit connection may provide a reliable fit of the circular disc element on the rotational shaft. For example, the circular disc element may be attached to the rotational shaft by means of a fitting key. However, it is also possible that the circular disc element may be attached to the rotational shaft by means of a welded or soldered connection. However, it is preferred that the circular disc element is attached to the rotational shaft by means of a releasable connection.

The circular disc element may further comprise a sleeve element or a sleeve in the region of the inner circumference, wherein the sleeve element protrudes from the abutting surfaces of the circular disc element in the longitudinal direction. In particular, the sleeve element which is located at the inner circumference of the circular disc element is thicker than the remaining region of the circular disc element such that a better force-fit connection or form-fit connection to the rotational shaft can be achieved. In particular, a better stability of this connection to the rotational shaft can be achieved.

According to another embodiment of the invention, the length with which the at least two beam elements extend beyond the outer circumference of the circular disc element is adjustable.

In particular, the second section of the beam elements, e.g. the section of the beam element which extends beyond the outer circumference of the circular disc element is adjustable. The adjustment may be carried out by a manual change of the length of the beam elements, for example by shifting the beam elements into another position. However, it is also possible that the adjustment may be carried out by manufacturing beam elements with different beam lengths.

According to another embodiment of the invention, the diameter of the at least two holes extending through the circular disc element is adjustable. The adjustment of the diameter of the at least two holes may be carried out by the attachment of specified plates to the circular disc element, wherein the specified plates each have a hole with a different diameter. In this manner, a manual adjustment of the diameter of the at least two holes in the circular disc element can be achieved. This aspect will also be described in more detail in the description of the figures.

According to another embodiment of the invention, the at least two beam elements are attached to the circular disc element by means of a connection selected from the group consisting of a force-fit connection, a form-fit connection, a key connection, an adhesive connection, a welded connection and a soldered connection.

In a preferred embodiment, the at least two beam elements are attached to the circular disc element by means of a key connection or a key joint. In particular, the preferred embodiment comprises four beam elements which are attached to the circular disc element by means of a key connection. The connection, in particular the key connection, may be located at a cut-out section of the circular disc element. The cut-out sections at which the beam elements are mounted to the circular disc element may form recesses on the outer circumference of the circular disc element.

According to another embodiment of the invention, the circular disc element comprises three, four, five, six, seven or eight beam elements. According to another embodiment of the invention, the circular disc element comprises three, four, five, six, seven or eight holes. However, in a preferred embodiment of the invention, the circular disc element comprises exactly four beam elements and exactly four holes, which are arranged in an alternate manner as described above.

According to another aspect of the present invention, a use of the circular disc element described above as grinding means in a grinding process is provided. “Grinding means” according to the present invention are means which support the grinding process, i.e. which support the grinding of e.g. a mineral slurry in the presence of grinding beads.

In particular, the circular disc element described above is used in a device for grinding slurry, in particular wet mineral slurry. It is possible that a combination of the inventive circular disc element and other grinding discs, which have a different shape is used as grinding means in a grinding process. In particular, different types of grinding discs including the inventive circular disc element can be used as a grinding means in a grinding process. The grinding process may be described as a process in which wet mineral slurry is fed into a grinding device as described herein yielding a particulate slurry with lower or reduced particle size. The mineral slurry may for instance be a calcium carbonate slurry.

According to another aspect of the present invention, a device for grinding slurry is provided. The device comprises an elongated chamber having a rotational shaft extending between a first end and a second end of the elongated chamber. The at least one circular disc element described above is attached to the rotational shaft between the first end and the second end of the chamber such that slurry is ground within the chamber when the slurry is conveyed from the first end to the second end of the chamber.

In particular, the device for grinding slurry, e.g. the stirred media mill, is fed with grinding media, in particular ceramic beads, in a size range from 0.3 mm to 3.0 mm, depending on the desired product fineness. The beam elements of the circular disc element agitate and accelerate the media or beads within the chamber. The grinding takes place mainly between the beads and an inner wall or an inner surface of the chamber and between the beads themselves. The beam elements however provide for a more efficient acceleration of the media or beads as compared to only a flat disc without beam elements. This in turn provides for an improved throughput of mineral slurry through the chamber. Furthermore, the circular disc element reduces the bypass flow along the shaft in the longitudinal direction, e.g. in the axial direction of the shaft. In this manner, a reduction of the amount of coarse particles in the product can be achieved. This in turn provides for an improved product quality.

The slurry to be ground is introduced into the preferably vertically arranged, elongated chamber at a bottom part of the elongated chamber. Afterwards, the introduced slurry is conveyed through the elongated chamber in an upward direction such that the ground slurry can be discharged from the elongated chamber at a top part of the elongated chamber. During the conveyance of the slurry through the elongated chamber, coarse particles of the slurry are refined such that the product, e.g. the refined slurry, can be discharged at the top part of the elongated chamber. Within the elongated chamber, a rotational shaft rotates such that the circular disc element or the circular disc elements, which is/are attached to the rotational shaft also rotate(s). The rotating circular disc elements with the extending beam elements accelerate the beads and reduce the bypass flow along the shaft while rotating. The required product particle size may be obtained by adjusting the feed rate, the slurry concentration, the amount of grinding media or beads and/or the speed of the milling shaft.

It is possible that a combination of the inventive circular disc element and other rotating discs on the rotational shaft are used to grind the slurry within the elongated chamber.

According to an embodiment of the invention, a plurality of circular disc elements is attached to the rotational shaft between the first end and the second end of the chamber such that slurry is ground within the chamber when the slurry is conveyed from the first end to the second end of the chamber.

In particular, the inventive circular disc elements are arranged in juxtaposition or in a consecutive manner within the elongated chamber. Therefore, the introduced slurry to be ground passes several, in particular all of the plurality of circular disc elements arranged within the elongated chamber. It is possible that the plurality of circular disc elements is combined with a plurality of other disc elements which have a different shape within the elongated chamber.

It should be understood that the first end of the elongated chamber comprises the inlet of the chamber in which the slurry to be ground is fed into the elongated chamber and the second end comprises the outlet of the chamber in which the ground slurry or refined slurry is discharged from the elongated chamber.

According to another embodiment of the invention, a plurality of protruding elements is attached to an inner surface of the chamber wherein each of the plurality of protruding elements protrudes into the elongated chamber such that a part of each of the plurality of protruding elements is arranged between two respective circular disc elements.

In particular, an alternate arrangement of protruding elements and circular disc elements is realized within the elongated chamber. The protruding elements may also have the shape of a disc with a central through-hole through which the rotational shaft of the device for grinding slurry extends. However, the protruding elements and the rotational shaft are not connected. There is rather a distance between them, which allows a conveyance of the slurry through the chamber. A protruding element is, therefore, attached to an inner wall or in a surface of the elongated chamber via its outer circumference. Therefore, the rotating circular disc element is attached to the rotational shaft wherein the protruding elements are attached to the elongated chamber. The protruding elements protrude into the elongated chamber perpendicular to the longitudinal direction of the rotational shaft or the longitudinal direction of the circular disc element. There may be a region of the circular disc element, in particular the beam elements of the circular disc element, in which the beam elements overlap with the protruding elements when looking into the longitudinal direction. In other words, a part of each of the plurality of protruding elements is arranged between two respective circular disc elements, e.g. between two respective beam elements extending beyond the outer circumference of the circular disc element. However, there is no direct connection between the beam elements and the protruding elements.

According to another aspect of the present invention, a method for grinding a mineral slurry is provided. In a step of the method, a slurry is fed into an elongated chamber having a rotational shaft extending between a first end and a second end of the elongated chamber. In a second step, at least one circular disc element as described above is rotated within the elongated chamber, wherein the at least one circular disc element is attached to the rotational shaft extending between the first end and the second end of the chamber. In another step of the method, the slurry is ground within the chamber when the slurry is conveyed from the first end to the second end of the chamber.

The circular disc element, in particular the extending beam elements of the circular disc element, accelerate the slurry within the chamber such that beads of the slurry interact with an inner surface or inner wall of the chamber resulting in a refinement of the mineral slurry. Furthermore, an interaction between the beads and the slurry themselves also leads to a refinement of the slurry during conveyance of the slurry through the chamber. After grinding the slurry within the chamber, it is discharged from the second end of the chamber, in particular at the outlet of the chamber which is arranged at a top part of the chamber such that the discharged ground slurry can be used for further processing.

DETAILED DESCRIPTION OF THE DRAWINGS

Figure 1:
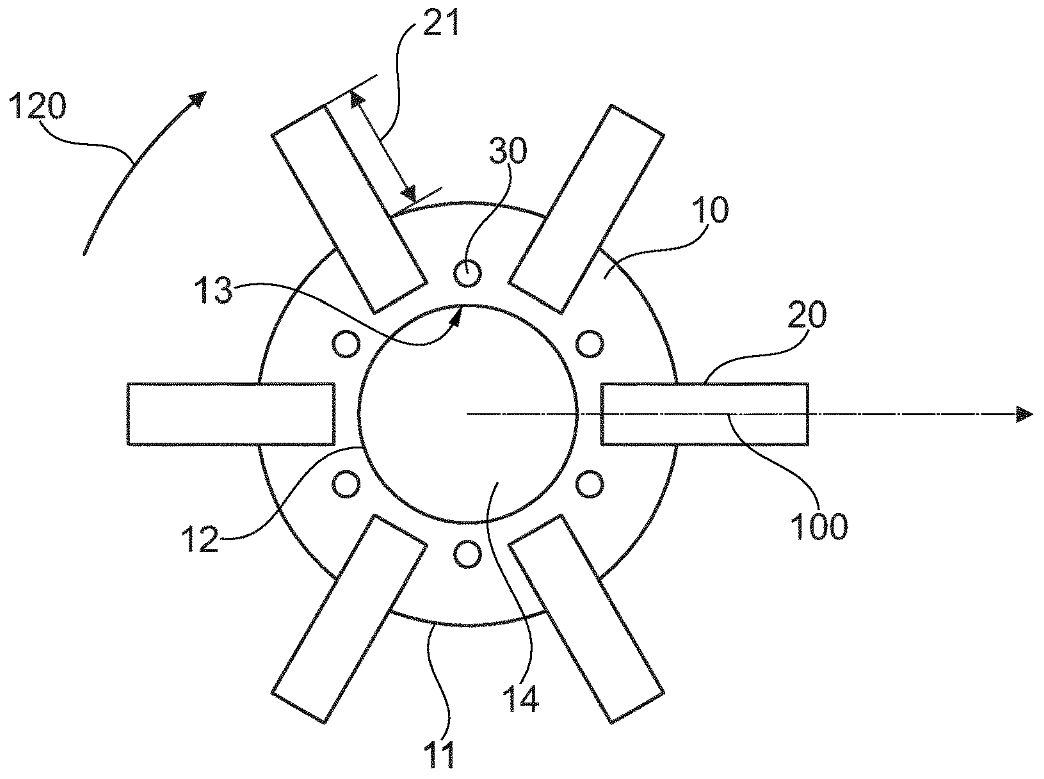
FIG. 1 schematically shows a circular disc element according to an embodiment of the invention.

FIG. 1 shows a circular disc element 10 with extending beam elements 20, wherein the extending beam elements 20 extend beyond an outer circumference 11 of the circular disc element 10. The circular disc element 10 further comprises holes 30, in particular through-holes, which extend through the circular disc element 10. The circular disc element 10 further comprises a further hole or a central hole 14 for receiving a rotational shaft not shown in FIG. 1. In other words, the circular disc element 10 comprises an inner circumference 12, which limits the central hole 14. Therefore, the circular disc element 10 comprises a curved fitting surface 13 with a circular shape at the inner circumference 12 of the circular disc element 10.

The holes 30 may have the function of steam holes, which are arranged at a specified distance to the centre of the circular disc element 10. In FIG. 1, each of the holes 30 are spaced apart from the centre of the circular disc element 10 with the same distance.

The beam elements 20 are attached to the circular disc element 10 in such a manner that the extending beam elements 20 extend beyond the outer circumference 11 of the circular disc element 10. In particular, the extending beam elements 20 can be divided into two sections, wherein a first section of the beam elements 20 overlaps with the circular disc element 10 and another section, e.g. a second section with a length 21 of the extending beam elements 20, extends beyond the outer circumference 11 of the circular disc element 10 and therefore does not overlap with the circular disc element 10.

The extending beam elements 20 are spaced apart from each other in an equidistant manner with respect to a circumferential direction 120 of the circular disc element 10. The embodiment of FIG. 1 shows the arrangement of six extending beam elements 20, which are attached to the circular disc element 10. In this case, the angle between each of the extending beam elements 20 with respect to the circumferential direction 120 amounts to 60°.

Between each of the extending beam elements 20, one hole 30 is arranged. In other words, the holes 30 and the beam elements 20 are arranged on the circular disc element 10 in an alternate manner. It is possible that the angle in the circumferential direction 120 between each hole 30 and each beam element 20 is the same. Therefore, the holes 30 and the extending beam elements 20 are equidistantly arranged on the circular disc element 10 in an alternate manner with respect to the circumferential direction 120.

The extending beam elements 20 extend in a radial direction, wherein the radial direction is congruent to the extension direction 100 of the beam elements 20. FIG. 1 therefore shows the simplest embodiment of the inventive circular disc element 10 in which the beam elements 20 extend along the radial directions of the circular disc element 10.

Figure 2:
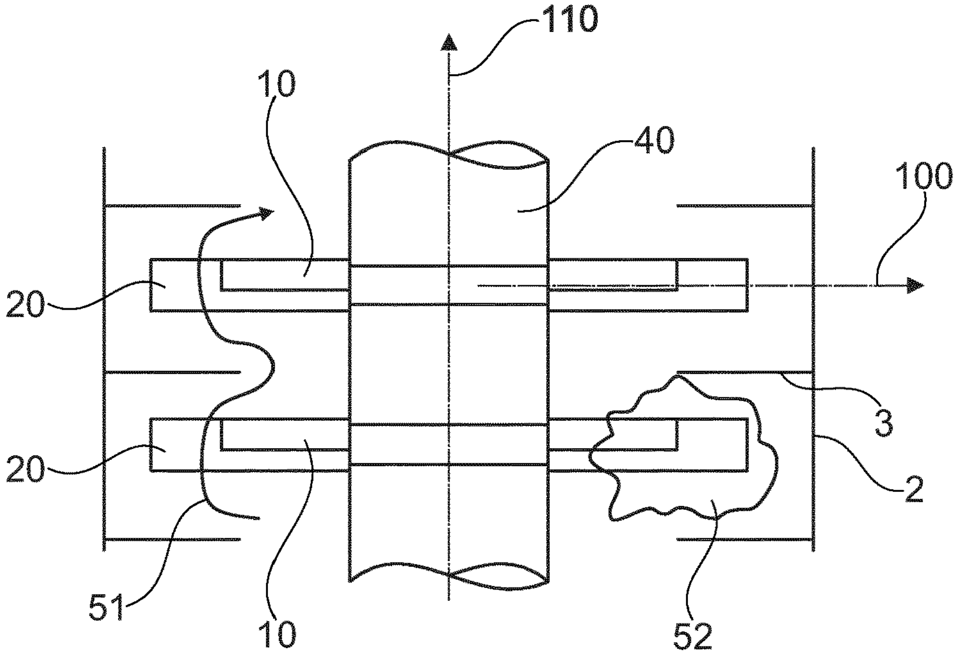
FIG. 2 schematically shows a part of a device for grinding slurry with two circular disc elements according to an embodiment of the invention.

FIG. 2 shows the arrangement of two circular disc elements 10 on a rotational shaft 40, wherein the circular disc elements 10 are attached to the rotational shaft 40 by means of a force-fit connection or a form-fit connection. Preferably, the attachment of the circular disc elements 10 to the rotational shaft 40 is provided by a fitting key connection.

FIG. 2 also shows a part of a chamber 2 of a device for grinding slurry, wherein protruding elements 3 protrude into the elongated chamber 2. The elongated chamber 2 of which only a part is shown in FIG. 2 extends along the longitudinal direction 110. Furthermore, the rotational shaft 40 also extends along the longitudinal direction 110 such that the circular disc elements 10 are attached to the rotational shaft 110 in juxtaposition.

The protruding elements 3 may be imagined as circular disc elements, which are attached to the chamber 2 via their outer circumference. In other words, the protruding elements 3 are attached to the static chamber 2 and the circular disc elements 10 are attached to the rotational shaft 40. Thus, the circular disc elements 10 are rotating within the static chamber 2 in order to accelerate beads of the slurry to be conveyed through the chamber 2. A moving path 51 of the slurry, e.g. the beads of the slurry, is also shown in FIG. 2. The beam elements 20 of the circular disc element 10, which are also called agitating arms, accelerate the beads within the chamber 2 such that a refinement of the beads can be achieved by the interaction between the beads themselves and between the beads and an inner wall or an inner surface of the chamber 2. A grinding zone 52 is also shown in FIG. 2. This grinding zone 52 shows the region in which the beads are ground or refined with the help of the extending beam elements 20, the inner wall of the chamber 2 and the protruding elements 3.

Figure 3:
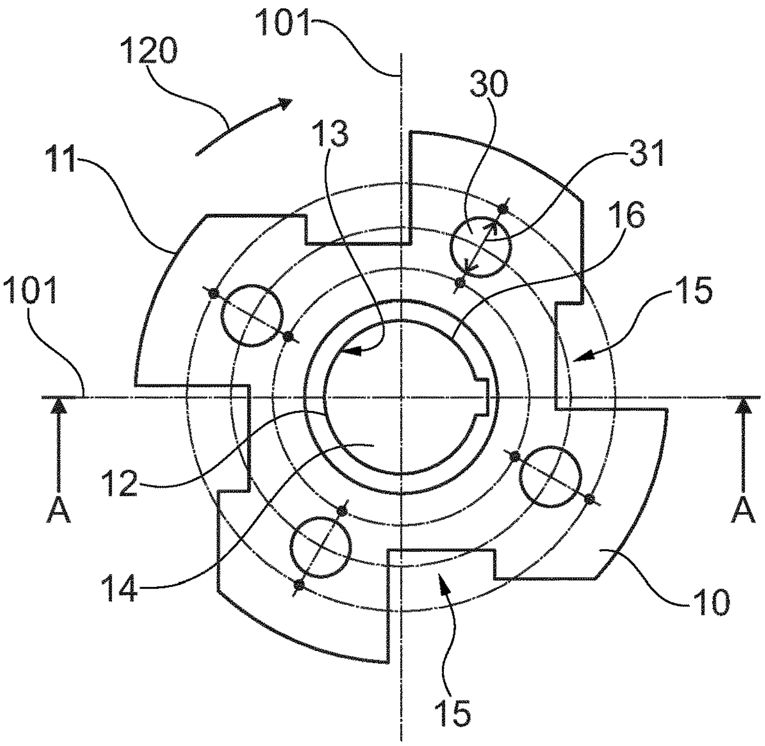
FIG. 3 shows a top view of a circular disc element without extending beam elements according to an embodiment of the invention.

FIG. 3 shows a top view of a circular disc element 10 without beam elements 20. This figure clarifies that the circular disc element 10 comprises cut-out sections 15, e.g. cutting sections, at its outer circumference, wherein the cut-out sections 15 provide a region for receiving the extending beam elements 20 not shown in FIG. 3. In a preferred embodiment, the circular disc element 10 comprises exactly four cut-out sections 15 for receiving exactly four extending beam elements 20.

The circular disc element 10 comprises an outer circumference 11 which limits the outer diameter of the circular disc element itself. The diameter of the circular disc element 10 may be between 260 and 300 mm. Preferably, the diameter of the circular disc element 10 is about 280 mm. The circular disc element 10 comprises a central hole 14, wherein the central hole 14 is defined by the inner circumference 12. The inner circumference 12 however is defined by a curved fitting surface 13 which is adapted for receiving the rotational shaft 40 not shown in FIG. 3. The circular disc element 10 comprises a sleeve element 16 which is arranged at the inner circumference 12 of the circular disc element 10 and which forms a region that is thicker than the remaining part of the circular disc element 10 with respect to the longitudinal direction. This aspect can be seen in FIG. 7, which shows that the sleeve element 16 has a greater extension in the longitudinal direction 110 of the circular disc element 10 than the remaining part of the circular disc element 10.

The circular disc element 10 comprises a radial direction 101, which has its origin in the centre point of the circular disc element 10. In particular, the circular disc element 10 has several radial directions 101, which have their origin in the centre point of the circular disc element 10. The circumferential direction 120 is measured along the outer circumference 11 of the circular disc element 10.

Through-holes 30 are located on the circular disc element 10. The holes 30 may have a diameter 31, which is adjustable. Holes 30 are arranged in an equidistant manner with respect to the circumferential direction 120 on the circular disc element 10. Analogously, the cut-out sections 15 located at the outer circumference 11 of the circular disc element 10 are also arranged in an equidistant manner at the circular disc element 10 with respect to the circumferential direction 102.

Figure 4:
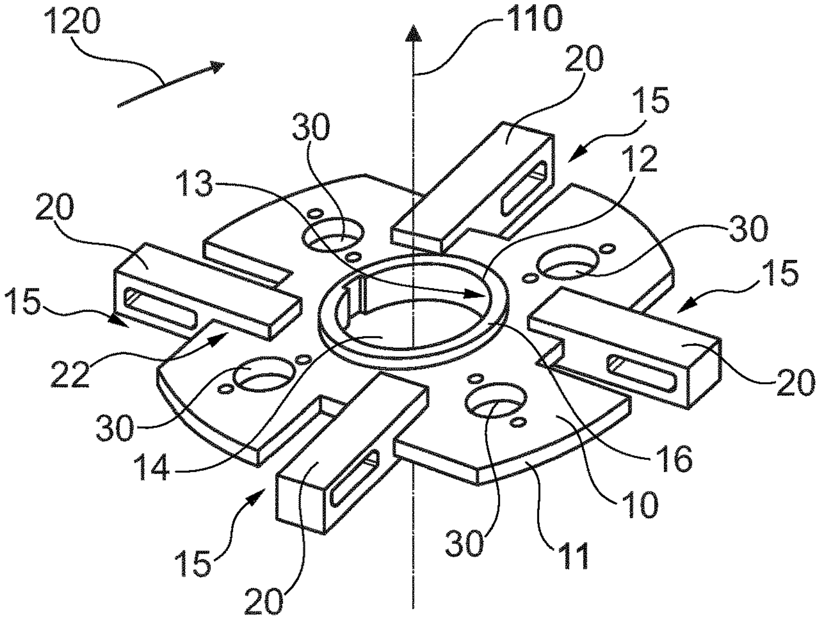
FIG. 4 shows an isometric view of a circular disc element according to an embodiment of the invention.

FIG. 4 shows an isometric view of a circular disc element 10 having four extending beam elements 20 in the region of the cut-out sections 15 of the circular disc element 10. The extending beam elements 20 extend beyond the outer circumference 11 of the circular disc element 10. Furthermore, four holes 30 are arranged on the circular disc element 10. The beam elements 20 are equidistantly spaced apart from each other along the circumferential direction 120 and the holes 30 are also equidistantly spaced apart from each other on the circular disc element 10. The isometric view in FIG. 4 also shows that the sleeve element 16 at the inner circumference 12 of the circular disc element 10 has a greater thickness than the remaining part of the circular disc element 10. The sleeve element 16 provides at its inner circumference 12 a curved fitting surface 13, which is adapted for receiving the rotational shaft 40 not shown in FIG. 4. Therefore, the circular disc element 10 provides in the region of the sleeve element 16 a central hole 14 through the circular disc element 10 in the longitudinal direction 110. The holes 30 which are spaced apart from the centre point of the circular disc element 10 also extend in the longitudinal direction 110 or parallel to the central axis of the circular disc element 10.

Figure 5:
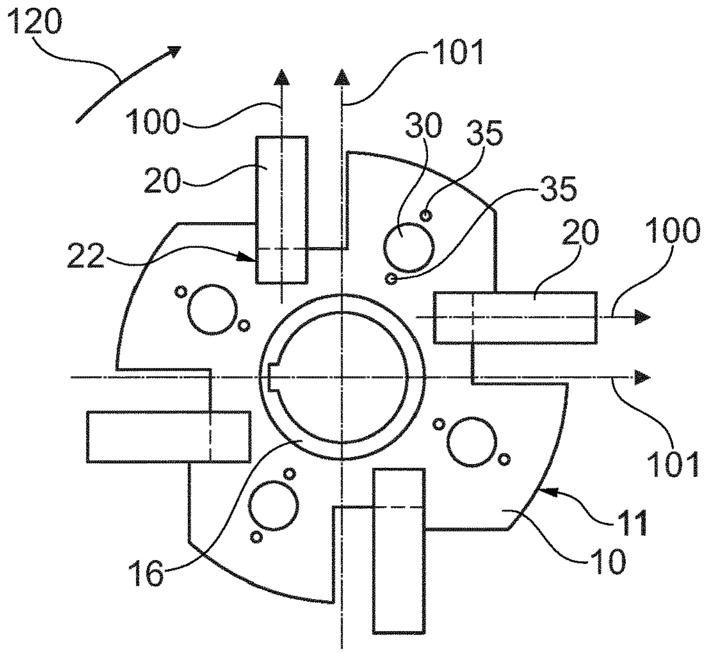
FIG. 5 shows a top view of a circular disc element according to an embodiment of the invention.

FIG. 5 shows a top view of the circular disc element 10 as shown in FIG. 4. From FIG. 5, the equidistant arrangement of the holes 30 with respect to the circumferential direction 120 can be recognized. Analogously, the equidistant arrangement of the extending beam elements 20 with respect to the circumferential direction 120 can also be recognized in FIG. 5.

In contrast to the embodiment shown in FIG. 1, the extension directions 100 of the beam elements 20 are spaced apart from the radial directions 101 of the circular disc element 10. However, the extension directions 100 of the beam elements 20 are arranged in a parallel manner to the radial directions 101 of the circular disc element 10. In this aspect, the circular disc element 10 shown in FIG. 5 is different from the embodiment as shown in FIG. 1. However, the embodiment of the circular disc element 10 shown in FIG. 5 also comprises an alternate arrangement of the holes 30 and the beam elements 20 with respect to the circumferential direction 120 of the circular disc element 10.

FIG. 5 also shows that the extending beam elements 20 overlap with the circular disc element 10 in a first section and extend beyond the outer circumference 11 of the circular disc element 10 in a second section. The extending beam elements 20 are connected with a key connection 22 to the circular disc element 10 in the region of the first section of the beam elements 20, i.e. in the overlapping region of the beam elements 20 and the circular disc element 10.

FIG. 5 also shows attachment means 35, for example in the form of attachment holes nearby the holes 30. These attachment means 35 may be configured for attaching plates to the circular disc element 10, wherein the plates are not shown in FIG. 5. The plates which are described in FIGS. 8 and 9 may be configured to adapt the diameter of the holes 30 on the circular disc element 10.

Figure 6:
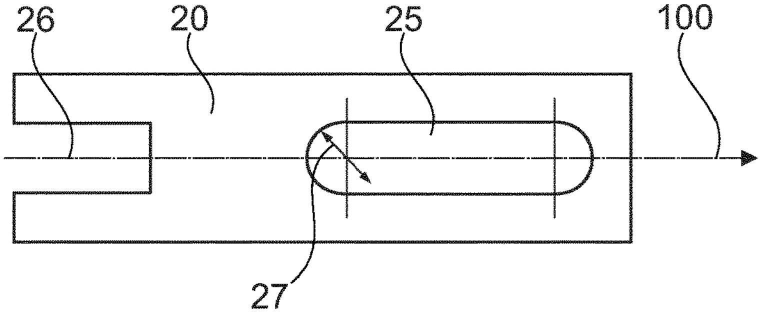
FIG. 6 shows a side view of a beam element according to an embodiment of the invention.

FIG. 6 shows a side view of a beam element 20, which is adapted to be connected to the circular disc element 10 not shown in FIG. 6. The beam element 20 comprises a recess 26, which is configured to receive a connecting part of the circular disc element 10, in particular for connecting the beam element 20 to the circular disc element 10 by means of a key connection 22 or a key joint. The beam element 20 further comprises a slot 25 in the form of an elongated hole with a radius 27. The radius 27 for instance amounts to about 13 mm. The slot 25 extends in the extension direction 100 of the extending beam elements 20. The slot 25 is configured for receiving fastening elements, for example screws as will be described in more detail in FIGS. 8 and 9.

Figure 7:
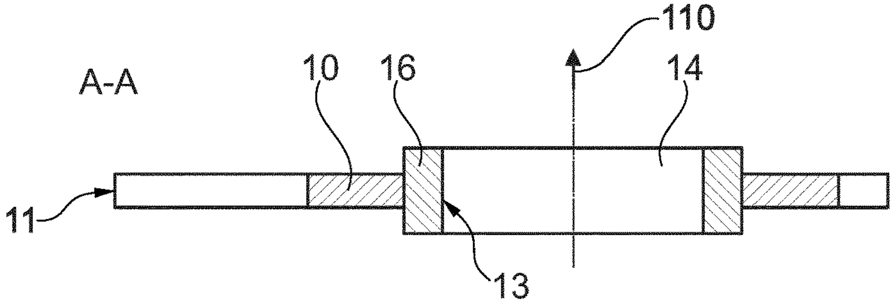
FIG. 7 shows a cross-sectional view of a circular disc element without extending beam elements according to an embodiment of the invention.

FIG. 7 shows the cross-sectional view A-A through the circular disc element shown in FIG. 3. The cross-sectional view of FIG. 7 shows that the sleeve element 16 has a greater thickness as the remaining part of the circular disc element 10. The sleeve element 16 is adapted to receive the rotational shaft 40 not shown in FIG. 7 with its curved circular fitting surface 13. In particular, the rotational shaft 40 not shown in FIG. 7 is received by the central hole 14 of the circular disc element 10. The enhanced thickness of the sleeve element 16 along the longitudinal direction 110 provides for a proper connection between the rotational shaft 40 and the circular disc element 10. FIG. 7 also shows the outer circumference 11 of the circular disc element.

Figure 8:
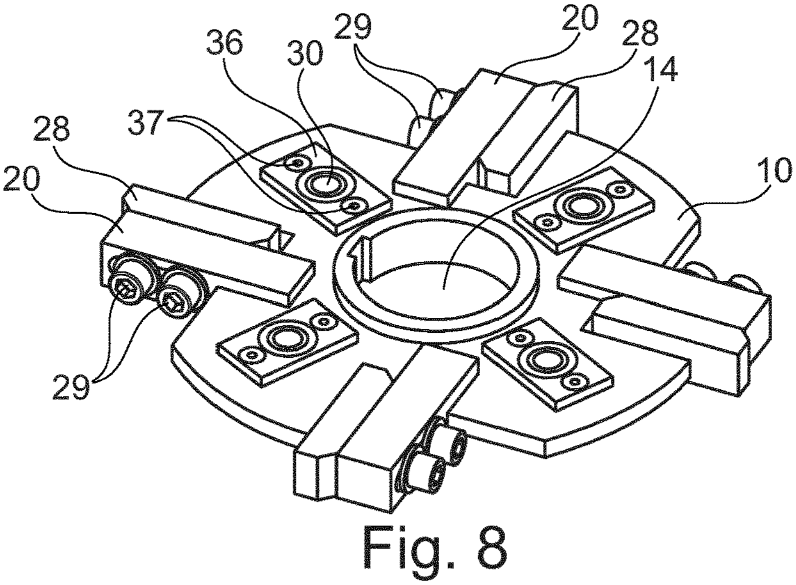
FIG. 8 shows an isometric view of a circular disc element according to another embodiment of the invention.

FIG. 8 shows an isometric view of the circular disc element 10 according to another embodiment of the invention. Therein, the extending beam elements 20 of the circular disc element 10 each comprise an extension element 28 which is fastened to the beam elements 20 by means of fastening elements 29, in particular by means of a screw connection. FIG. 8 shows that the extension element 28 is fixed to a respective beam element 20 by means of two screws. The fastening elements 29, e.g. the screws, extend through the elongated hole 25 of the beam element 20 in order to fasten the extension element 28. The extension element may have the shape of a cuboid. The extension element 28 may be chamfered at least two edges which are directed towards the beam element 20 when the extension element 28 is fastened to the beam element 20.

FIG. 8 further shows plates 36, which are attached to an abutting surface of the circular disc element 10. The plates 36 have a hole 30 and in particular provide a means for adapting the diameter of the hole 30. In particular, plates 36 having holes 30 with different sizes or diameters may be provided and fastened to the abutting surface of the circular disc element 10 in order to adapt the diameter of the holes 30. The plates 36 may be fastened to the circular disc element 10 by means of fastening elements 37 which correspond to the fastening holes 35 shown in FIG. 5.

Figure 9:
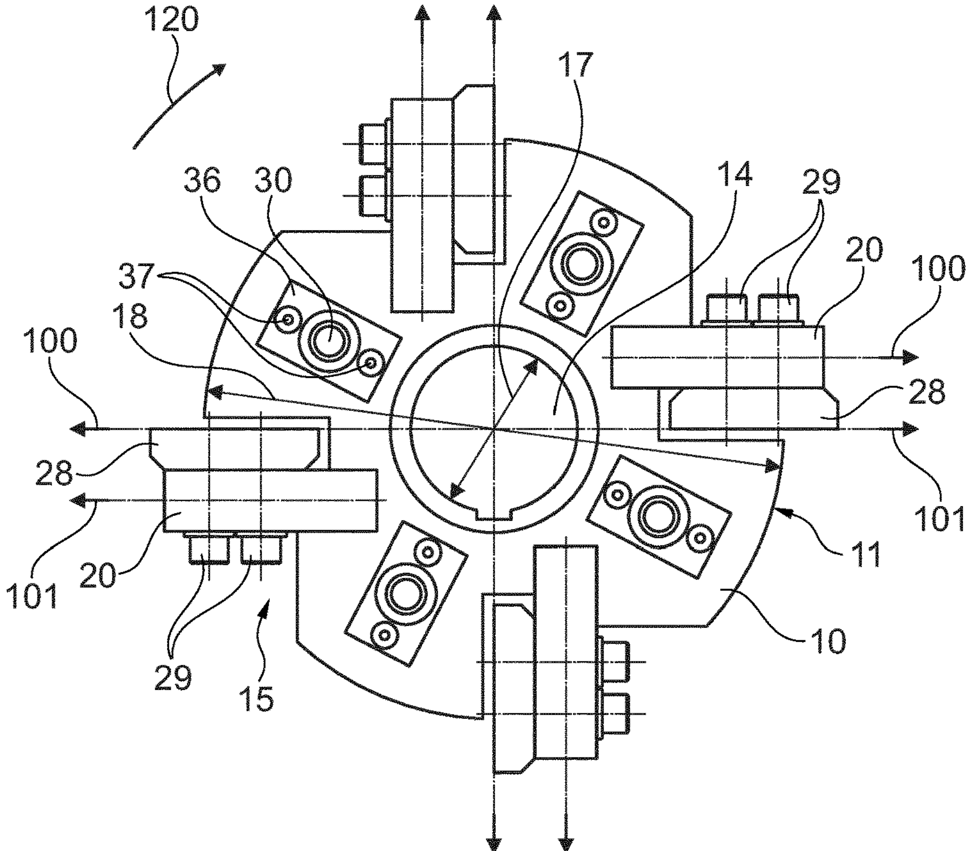
FIG. 9 shows a top view of a circular disc element according to another embodiment of the invention.

FIG. 9 shows a top view of the circular disc element 10 shown in FIG. 8. This figure clearly shows that the extending beam elements 20 each have an extension direction 100 which is parallel to the radial direction 101 of the circular disc element 10. FIG. 9 also shows that the extending beam elements 20 are attached to the circular disc element 10 in an equidistant manner with respect to the circumferential direction 120. The diameter 18 of the circular disc element 10 may be between 260 and 300 mm. Preferably, the diameter 18 of the circular disc element 10 amounts to about 280 mm. The diameter of the central hole 14 of the circular disc element 10 may be between 60 and 100 mm. Preferably, the diameter 17 of the central hole 14 amounts to about 80.3 mm.

Extension elements 28 are attached to each of the beam elements 20 by means of fastening elements 29. The fastening elements 29 may be screws which extend through the elongated hole 25 of the beam elements 20 not shown in FIG. 9. The fastening elements 29, e.g. the screws, extend through the beam elements 20 perpendicular to the longitudinal direction 110 in order to fasten the extension elements 28 to the beam elements 20. FIG. 9 shows a configuration in which exactly two screws attach the extension elements 28 to each of the beam elements 20.

FIG. 9 further shows the arrangement of the plates 36 on the abutting surface of the circular disc element 10 in order to adapt the diameter of the holes 30 in the circular disc element 10. Fastening elements 37 are also used to fasten the plates 36 to the circular disc element 10. FIG. 9 shows that the plates 36 are equidistantly spaced apart from each other with respect to the circumferential direction 102 on the circular disc element 10.

FIG. 9 shows a configuration in which exactly four beam elements, each having an extension element 28, are arranged in a region of the cut-out sections 15 of the circular disc element 10. FIG. 9 further shows the configuration in which exactly four holes 30 are arranged on the circular disc element 10, the diameter of each hole being adjustable by the hole within a plate 36 which is mountable to the abutting surface of the circular disc element 10. In the configuration shown in FIG. 9, the holes 30 are equidistantly spaced apart from each other with respect to the circumferential direction 120 of the circular disc element 10, wherein the angle between each of the holes 30 amounts to 90°. The configuration also shows an alternate arrangement of the holes 30 and the beam elements 20 on the circular disc element 10.

Figure 10:
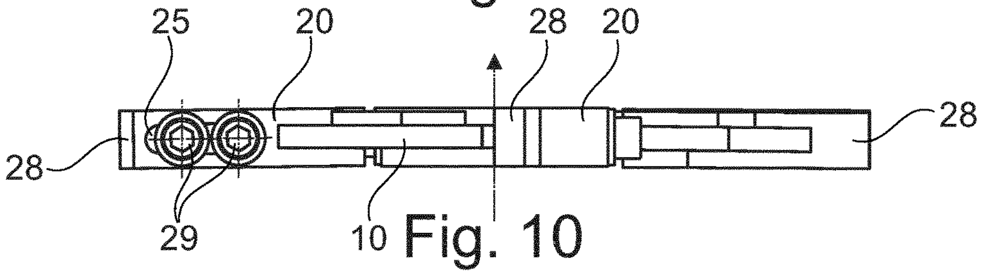
FIG. 10 shows a side view of a circular disc element according to another embodiment of the invention.

FIG. 10 shows a side view of the circular disc element 10 shown in FIG. 9. FIG. 10 clearly shows that the fastening elements 29, e.g. the screws, extend through the elongated hole 25 of the beam element 20. The elongated hole 25 provides for an adjustable connection between the extension element 28 and the extending beam element 20. In other words, the length with which the extension element 28 extends beyond the outer circumference 11 of the circular disc element can be adjusted by shifting the extension elements 28 within the elongated hole 25. It should be understood that the extension elements 28 may be a part of the beam elements 20. However, it is also possible that the extension elements 28 may be considered as separate parts with respect to the beam elements 20.

Figure 11:
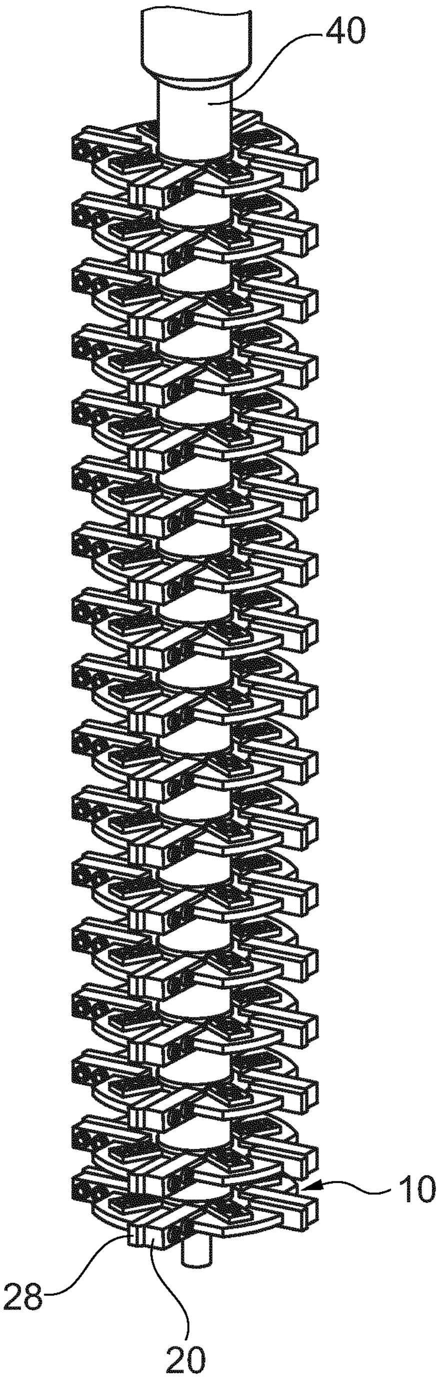
FIG. 11 shows an isometric view of a rotational shaft with a plurality of circular disc elements according to an embodiment of the invention.

FIG. 11 shows an isometric view of a rotational shaft 40 on which a plurality of circular disc elements 10 having extending beam elements 20 are mounted. FIG. 11 also shows that the extension elements 28 are mounted to the respective extending beam elements 20 of each circular disc element 10 of the plurality of circular disc elements 10.

Figure 12:
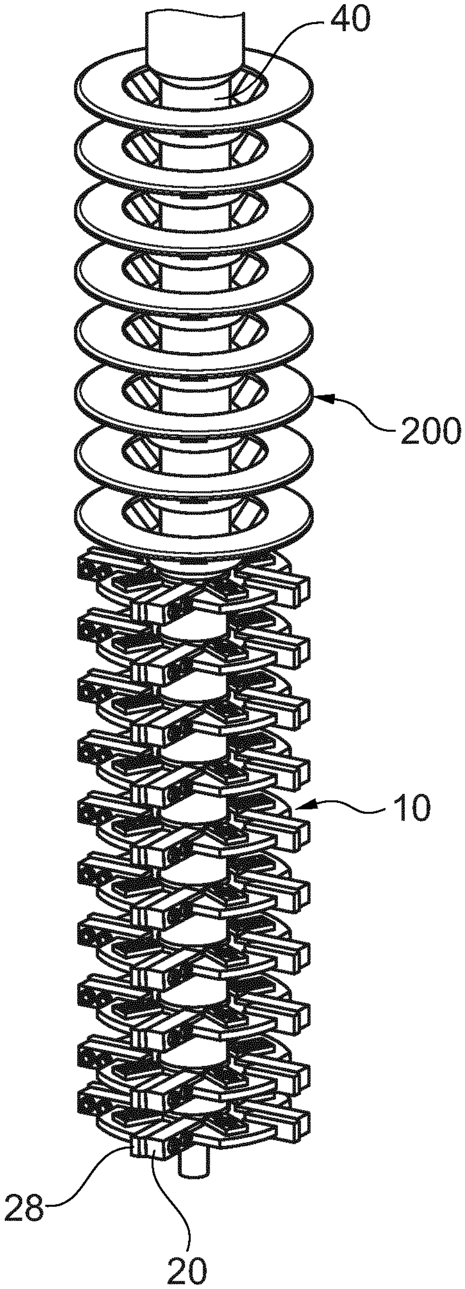
FIG. 12 shows a rotational shaft with a combination of conventional disc elements and circular disc elements according to an embodiment of the invention.

FIG. 12 shows a combination of the inventive circular disc elements 10 having the extending beam elements 20 and the extension elements 28 mounted thereon with conventional rotating discs 200 for grinding slurry. Different embodiments of the arrangement of different types of grinding discs are possible.

Figure 13:
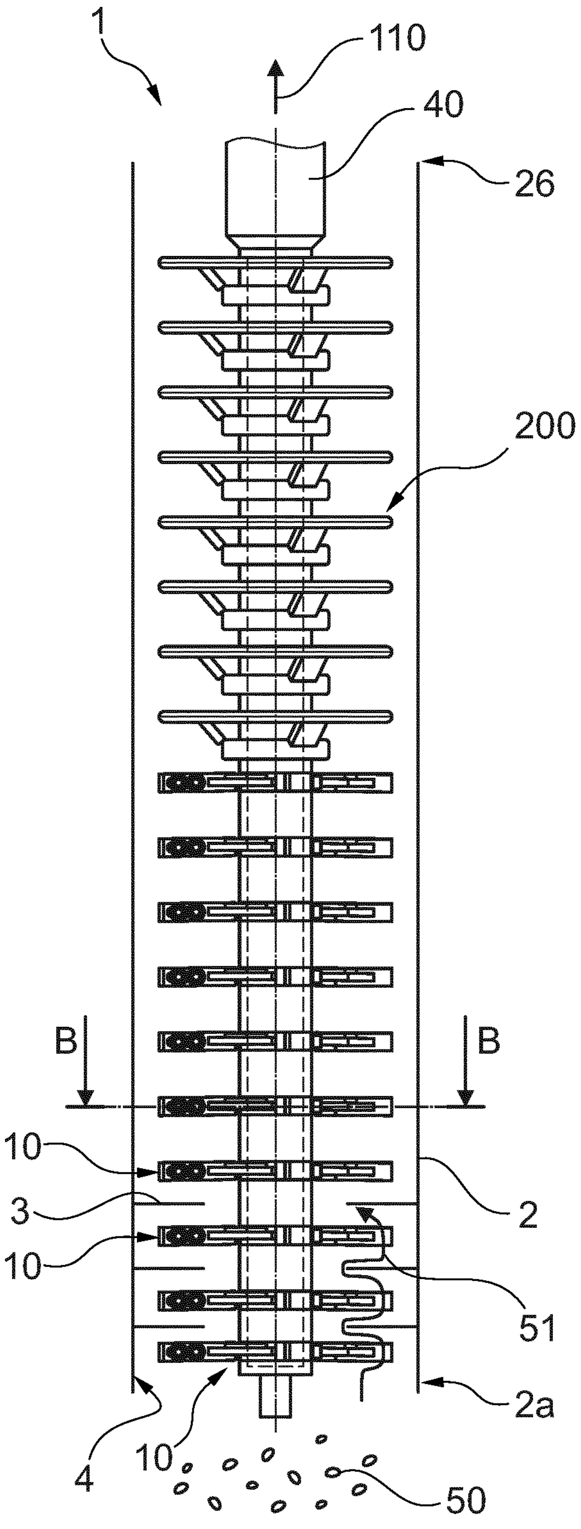
FIG. 13 shows a device for grinding slurry according to an embodiment of the invention.

FIG. 13 shows a device for grinding slurry comprising an elongated chamber 2 with a rotational shaft 40 mounted within the elongated chamber 2. The rotational shaft 40 extends between the first end 2*a* and the second end 2*b* within the elongated chamber 2. The plurality of the inventive circular disc elements 10 is mounted to the rotational shaft 40 in the region of the bottom part, e.g. at the first end 2*a* of the chamber 2. These inventive circular disc elements 10 are combined with other rotating discs 200 which are mounted to the rotational shaft 40 at the top part, e.g. at the second end 2*b* of the chamber 2.

A slurry with particulate material to be milled 50 is introduced into the chamber 2 at the first end 2*a* and are conveyed through the chamber 2 to the top part, e.g. to the second end 2*b* of the chamber 2 where the ground slurry is discharged from the chamber 2. On its way from the first end 2*a* to the second end 2*b* of the chamber 2, the slurry gets ground and therefore refined by means of the circular disc elements 10, grinding media, like ceramic grinding beads within the chamber 2 and the inner wall or inner surface 4 of the elongated chamber 2. Furthermore, protruding elements 3 are mounted to the inner wall or inner surface 4 of the chamber 2, wherein the protruding elements 3 protrude into the chamber 2 perpendicularly to the longitudinal direction 110. The flow path 51 of the slurry 50 is also shown in FIG. 13. The grinding of the particulate material in the slurry is carried out by the interaction of the circular disc elements 10 which accelerate the grinding media (beads) and the inner wall or inner surface 4 of the chamber 2 as well as the protruding elements 3 reaching into the chamber 2. The protruding elements 3 may have the shape of discs which are attached to the inner wall 4 of the chamber 2 via their outer circumferences. In particular, the protruding elements 3 provide contra-discs to the circular disc elements 10 whereas one protruding element may be arranged between at least a part of the circular disc element 10, in particular between at least a part of the beam elements 20 of the circular disc element 10.

It is possible that only 80% of the circular disc elements, e.g. the hybrid discs, are combined with these contra-discs, e.g. with the protruding elements 3. For example, it is possible that 10% of the circular disc elements 10 at the top part 2*b* and 10% of the circular disc elements 10 at the bottom part 2*a* are not intercalating with the contra-discs. In other words, only 80% of the circular disc elements 10 arranged within the device 1 for grinding slurry have arranged a protruding element 3 between them whereas the other 20% of the circular disc elements 10 do not have a protruding element 3 arranged between them.

Figure 14:
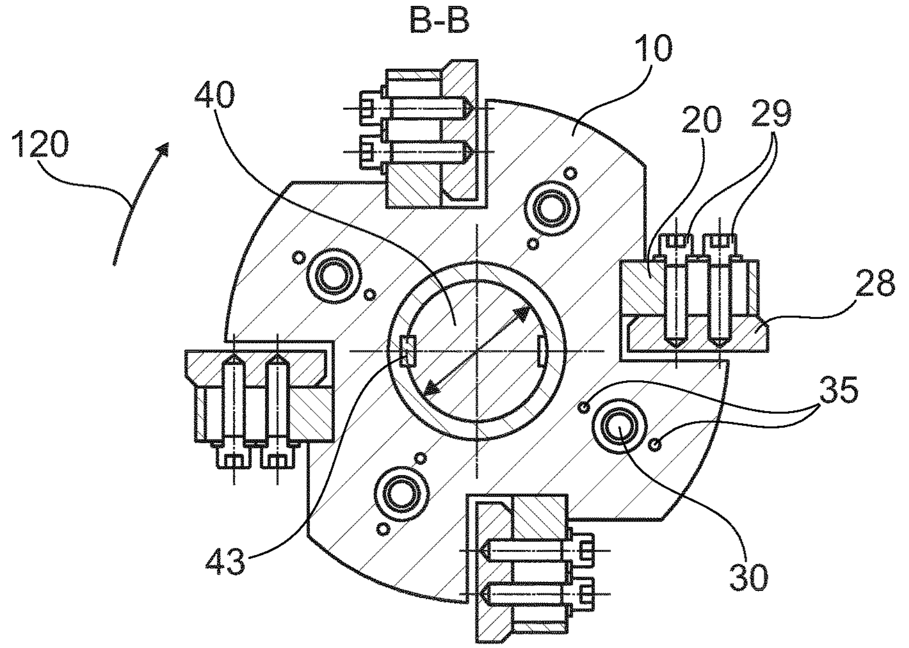
FIG. 14 shows a cross-sectional view through a circular disc element according to an embodiment of the invention.

FIG. 14 shows a cross-sectional view through a circular disc element 10 according to an embodiment of the invention. In particular, FIG. 14 shows the cross-section B-B from FIG. 13 except the chamber 2. The cross-section B-B of FIG. 14 shows a cross-section through the circular disc element 10 having four beam elements 20 with extension elements 28 mounted thereon. Extension elements 28 are fastened to the beam elements 20 by means of fastening elements 29, in particular by means of screws. FIG. 14 further shows the arrangement of the holes 30 which extend through the circular disc element 10 in the longitudinal direction. Furthermore, fastening holes 35 for receiving the fastening elements 37 of FIG. 9 are shown.

FIG. 14 further shows that the circular disc element 10 is connected to the rotational shaft 40 by means of a fitting key 43.

Figure 15:
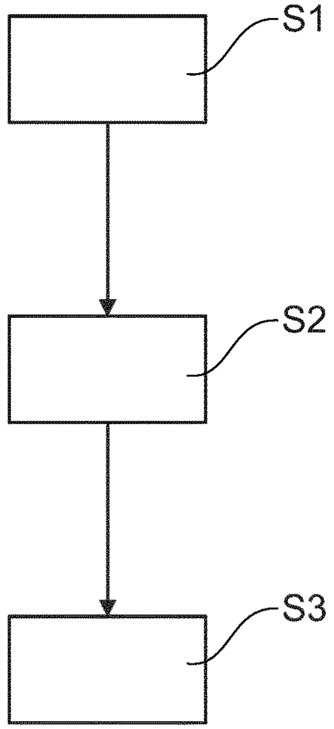
FIG. 15 shows a method for grinding a mineral slurry according to an embodiment of the invention.

FIG. 15 shows a method for grinding mineral slurry. In a first step S1 of the method, slurry 50 is fed into an elongated chamber 2 having a rotational shaft 40 extending between a first end 2*a* and a second end 2*b* of the elongated chamber 2. In a second step S2, at least one circular disc element 10 as described above is rotated, wherein the at least one circular disc element 10 is attached to the rotational shaft 40 extending between the first end 2*a* and the second end 2*b* of the chamber 2. In another step S3, the slurry 50 is ground within the chamber 2 when the slurry 50 is conveyed from the first end 2*a* to the second end 2*b* of the chamber 2. In particular, the slurry 50 is ground by an interaction with grinding media (grinding beads) within the chamber, the particulate material itself and by an interaction of the slurry 50 with the inner wall 4 of the chamber 2 and the protruding elements 3 reaching into the chamber 2. The agitating arms, e.g. the beam elements 20 of the circular disc element 10, may be configured for accelerating the grinding media/beads and the slurry 50 within the chamber 2.

While the invention has been illustrated and described in detail in the drawings and the foregoing description, such illustration and description are to be considered illustrative and exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims the term "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of protection.

The invention claimed is:

1. A circular disc assembly for a device for grinding slurry, comprising:

a circular disc element having a plane;

at least two beam elements, each beam element having a longitudinal axis each beam element located on the circular disc element such that the longitudinal axis is parallel to a radial direction of the circular disc element, and each beam element extending beyond an outer circumference of the circular disc element;

at least two holes extending through the circular disc element in a longitudinal direction which is perpendicular to each of the longitudinal axis of the at least two beam elements;

wherein the at least two beam elements are equidistantly spaced apart from each other with respect to a circumferential direction of the circular disc element, which circumferential direction corresponds to the outer circumference of the circular disc element;

wherein each beam element comprises a recess, wherein the recess receives a connecting part of the circular disc element;

wherein each beam element comprises a slot in the form of an elongated hole with a radius, wherein the recess and the slot extends on the longitudinal axis of the each beam element: and wherein the slot receives fastening elements that secure each beam element to an extension element in an adjustable manner along the longitudinal axis.

2. The circular disc element according to claim 1, wherein number of extending beam elements "n" is even and at least 4, while the number of the holes "m" correlates with the number of the beam elements "n" in that m=k * 0.5n, k being 1, 2, 3, 4, 5, 6, 7, 8, 9 or 10 or the number of extending beam elements "n" is uneven, while the number of the holes "m" correlates with the number of the beam elements "n" in that m=k * n, k being 1, 2, 3, 4, 5, 6, 7, 8, 9 or 10 or that the number of beam elements "n" is 2, while the number of holes "m" correlates with the number of beam elements "n" in that m=k * n, k being 1, 2, 3, 4, 5, 6, 7, 8, 9 or 10.

3. The circular disc element according to claim 1, wherein the at least two holes and the at least two beam elements are arranged in an alternate manner on the circular disc element with respect to the circumferential direction, wherein the number of extending beam elements is equal to the number of holes extending through the circular disc element.

4. The circular disc element according to claim 1, wherein each of the at least two holes is equidistantly arranged between the at least two beam elements with respect to the circumferential direction.

5. The circular disc element according to claim 1, wherein the extension of the at least two beam elements in the longitudinal direction is greater than the extension of the circular disc element in the longitudinal direction.

6. The circular disc element according to claim 1, wherein an extension of the at least two beam elements in the longitudinal direction is adjustable.

7. The circular disc element according to claim 1, further comprising:

an inner circumference which is defined by a curved fitting surface such that the circular disc element is attachable to a rotational shaft by means of a force fit connection or a form fit connection.

8. The circular disc element according to claim 1, wherein the length with which the at least two beam elements extend beyond the outer circumference of the circular disc element is adjustable.

9. The circular disc element according to claim 1, wherein a diameter of the at least two holes extending through the circular disc element is adjustable via attachment of hole inclusive plates.

10. The circular disc element according to claim 1, wherein the at least two beam elements are attached to the circular disc element by means of a connection selected from the group consisting of a force fit connection, a form fit connection, a key connection, an adhesive connection, a welded connection and a soldered connection.

11. The circular disc element according to claim 1, wherein the circular disc element comprises 3, 4, 5, 6, 7 or 8 beam elements; and/or wherein the circular disc element comprises 3, 4, 5, 6, 7 or 8 holes.

12. A device for grinding slurry wherein steam bubbles are formed during the grinding, comprising:

an elongated chamber having a rotational shaft extending between a first end and a second end of the elongated chamber;

wherein at least one circular disc element having a plane is attached to the rotational shaft between the first end and the second end of the elongated chamber such that slurry is ground within the elongated chamber when the slurry is conveyed from the first end to the second end of the elongated chamber;

wherein the at least one circular disc element comprises at least two beam elements, each beam element having a longitudinal axis, each beam element located on the at least one circular disc element such that the longitudinal axis is parallel to a radial direction of the at least one circular disc element, and each beam element extending beyond an outer circumference of the at least one circular disc element;

wherein at least two through holes extend through the at least one circular disc element in a longitudinal direction which is perpendicular to each of the extension directions of the at least two beam elements, said through holes configured to pass through the steam bubbles present in the grinding slurry during grinding; and wherein the at least two beam elements are equidistantly spaced apart from each other with respect to a circumferential direction of the at least one circular disc element, which circumferential direction corresponds to the outer circumference of the at least one circular disc element.

13. The device according to claim 12, wherein a plurality of circular disc elements are attached to the rotational shaft between the first end and the second end of the chamber such that slurry is ground within the chamber when the slurry is conveyed from the first end to the second end of the chamber.

14. The device according to claim 13, further comprising:

a plurality of protruding elements being attached to an inner surface of the chamber, wherein each of the plurality of protruding elements protrudes into the elongated chamber such that a part of each of the plurality of protruding elements is arranged between two respective circular disc elements.

15. A method for grinding a mineral slurry, comprising:

feeding slurry into an elongated chamber having a rotational shaft extending between a first end and a second end of the elongated chamber;

providing at least one circular disc element comprised of at least two beam elements, each beam element having a longitudinal axis, each beam element located on the circular disc element such that the longitudinal axis is parallel to a radial direction of the circular disc element, and each beam element extending beyond an outer circumference of the circular disc element;

at least two through holes extending through the circular disc element in a longitudinal direction which is perpendicular to each of the extension directions of the at least two beam elements;

wherein the at least two beam elements are equidistantly spaced apart from each other with respect to a circumferential direction of the circular disc element, which circumferential direction corresponds to the outer circumference of the circular disc element, wherein the at least one circular disc element is attached to the rotational shaft extending between the first end and the second end of the chamber; and rotating the at least one circular disc element to grind the slurry within the chamber when the slurry is conveyed from the first end to the second end of the chamber, wherein steam bubbles are formed during the grinding, and wherein the steam bubbles press through the holes during the grinding.

* * * * *